US012535328B2

(12) United States Patent
Lei et al.

(10) Patent No.: US 12,535,328 B2
(45) Date of Patent: Jan. 27, 2026

(54) SYSTEMS AND METHODS FOR FACILITATING USERS TO BOARD A VEHICLE

(71) Applicant: Ford Global Technologies, LLC, Dearborn, MI (US)

(72) Inventors: Oliver Lei, Windsor (CA); Mahmoud Yousef Ghannam, Canton, MI (US); Somak Datta Gupta, Novi, MI (US)

( * ) Notice: Subject to any disclaimer, the term of this patent is extended or adjusted under 35 U.S.C. 154(b) by 187 days.

(21) Appl. No.: 18/471,486

(22) Filed: Sep. 21, 2023

(65) Prior Publication Data

US 2025/0102312 A1    Mar. 27, 2025

(51) Int. Cl.
| | |
|---|---|
| *G01C 21/34* | (2006.01) |
| *H04W 4/021* | (2018.01) |
| *H04W 4/40* | (2018.01) |
| *H04W 4/46* | (2018.01) |

(52) U.S. Cl.
CPC ..... *G01C 21/3492* (2013.01); *G01C 21/3438* (2013.01); *H04W 4/021* (2013.01); *H04W 4/40* (2018.02); *H04W 4/46* (2018.02)

(58) Field of Classification Search
CPC .......... G01C 21/3492; G01C 21/3438; H04W 4/021; H04W 4/46; H04W 4/40
See application file for complete search history.

(56) References Cited

U.S. PATENT DOCUMENTS

| | | |
|---|---|---|
| 6,747,551 B1 | 6/2004 | Smith |
| 9,965,819 B1 | 5/2018 | DeVries |
| 2021/0089983 A1* | 3/2021 | Tamanaha ............... H04W 4/40 |

FOREIGN PATENT DOCUMENTS

| | | | |
|---|---|---|---|
| CN | 102592395 A | | 7/2012 |
| JP | 2005284730 A | * | 10/2005 |
| JP | 2019082877 A | * | 5/2019 |
| JP | 2020098449 A | * | 6/2020 |
| KR | 20190116778 A | | 10/2019 |
| WO | WO-2018128946 A1 | * | 7/2018 ............. G08G 1/162 |

OTHER PUBLICATIONS

2005284730 English Translation (Year: 2005).*
2019082877 English Translation (Year: 2019).*
2020098449 English Translation (Year: 2020).*
JP 2005284730 english translation (Year: 2005).*
(Continued)

*Primary Examiner* — Anne Marie Antonucci
*Assistant Examiner* — Nicholas Patrick Langhorne
(74) *Attorney, Agent, or Firm* — Joseph Zane; Eversheds Sutherland (US) LLP

(57) ABSTRACT

A vehicle including a transceiver, a human-machine interface (HMI) and a processor is disclosed. The transceiver may be configured to receive information associated with a pick-up point of a user and a real-time geolocation of a user device associated with the user. The processor may be configured to obtain the information associated with the pick-up point from the transceiver, and determine that a predefined condition may be met based on the information associated with the pick-up point. The processor may further obtain the real-time geolocation responsive to determining that the predefined condition may be met. The processor may then output the real-time geolocation on the HMI.

8 Claims, 5 Drawing Sheets

(56) References Cited

OTHER PUBLICATIONS

JP 2020098449 english translation (Year: 2020).*

Asif Ahmed et al., An Intelligent and Secured Tracking system for Monitoring School Bus, 2019 International Conference on Computer Communication and Informatics (ICCCI—2019), Sep. 29, 2019, pp. 1-5.

Anwaar Al-Lawati, et al., RFID-Based System for School Children Transportation Safety Enhancement, Proceedings of the 8th IEEE GCC Conference and Exhibition, Muscat, Oman, Mar. 2015, pp. 1-6.

* cited by examiner

SYSTEMS AND METHODS FOR FACILITATING USERS TO BOARD A VEHICLE

FIELD

The present disclosure relates to systems and methods for facilitating users to board a vehicle and more particularly to systems and methods for facilitating children to conveniently catch a school bus and informing nearby vehicles of the presence of children.

BACKGROUND

School buses provide convenient transportation means for young users (e.g., children) from their homes to the school and back. School buses typically reach the bus stops early morning to pick-up children and then drop the children at school. There are known instances of children running towards their respective bus stops to catch the school bus when the children may be late. Such instances may cause inconvenience to a school bus driver and drivers of other vehicles in proximity to the bus stop. For example, the school bus driver may not be aware that a child may be running towards the bus stop and may miss the bus if the school bus driver does not wait. Further, the drivers of other vehicles may not be aware of running children in the vicinity of the bus stop.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
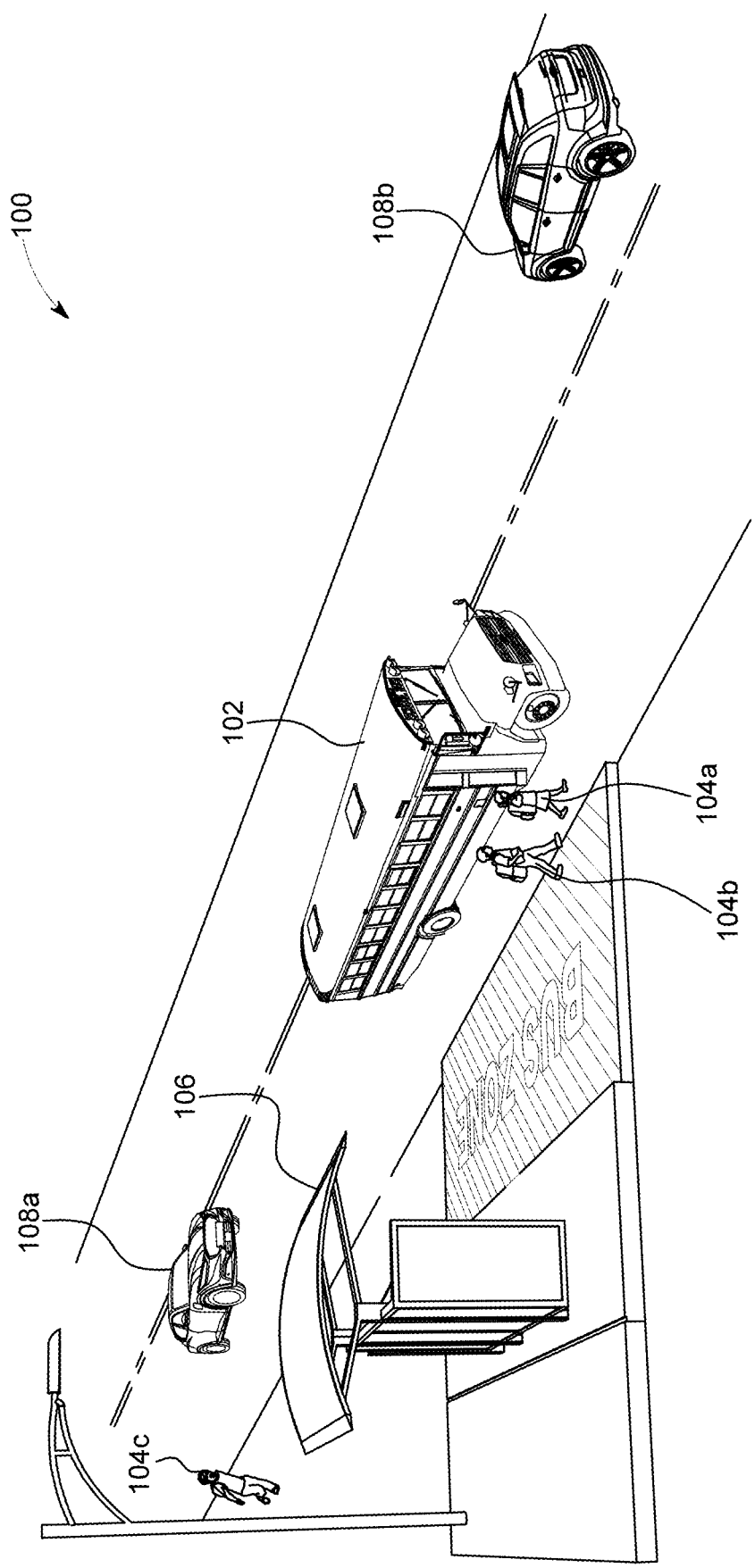
FIG. 1 depicts an example environment in which techniques and structures for providing the systems and methods disclosed herein may be implemented.

The present disclosure describes a vehicle that facilitates a plurality of users to conveniently board the vehicle. The vehicle may be a school bus and the users may be school children. The vehicle may specifically facilitate the users to conveniently reach to respective bus stops and board the vehicle. Each user may be associated with a user device, and the vehicle may be configured to obtain real-time geolocation of each user device from a server (that may be communicatively coupled with each user device). When the vehicle may be travelling towards a bus stop and may be a predefined distance away from the bus stop, the vehicle may obtain real-time user device geolocations associated with the users (and hence real-time user geolocation). Responsive to obtaining the real-time user geolocation, the vehicle may output the obtained user geolocation on a vehicle Human-Machine Interface (HMI). A vehicle operator (e.g., a school bus driver) may view the real-time user geolocation and may accordingly plan vehicle movement from the bus stop. For example, when the vehicle operator determines that a user may be slightly late in reaching to the bus stop at a scheduled vehicle departure time and may be running towards the bus stop based on the real-time user geolocation, the vehicle operator may cause the vehicle to wait at the bus stop and let the user board the vehicle. In this manner, the vehicle may facilitate the user to conveniently reach the bus stop and board the vehicle, even if the user may be slightly delayed.

In some aspects, when the user may be running/moving towards the bus stop at the scheduled vehicle departure time, the vehicle may determine a distance between the bus stop and the real-time user geolocation. When the distance may be less than a threshold at the scheduled vehicle departure time, the vehicle may output an alert notification on the HMI, indicating to the vehicle operator to wait and let the user reach to the bus stop and board the vehicle. On the other hand, if the distance may be greater than the threshold at the scheduled vehicle departure time, the vehicle may transmit, via the server, a departure notification to a user device associated with the user, indicating to the user that the vehicle may be departing from the bus stop and the user may catch the vehicle at a next bus stop.

In additional aspects, the vehicle may transmit (e.g., via vehicle-to-vehicle (V2V) communication) the real-time user geolocation and a real-time vehicle geolocation to one or more other vehicles that may be in proximity to the bus stop. The other vehicle may receive the real-time user geolocation and the real-time vehicle geolocation, and display the received geolocations on respective HMIs. Drivers associated with the other vehicles may view the real-time user geolocation and the real-time vehicle geolocation on the HMIs (even if they cannot see the users/vehicle on the road) and accordingly maneuver their vehicle movements, thereby enabling the users to conveniently reach the bus stop and board the vehicle, and the vehicle to conveniently reach or depart from the bus stop.

In some aspects, the vehicle may stop outputting the real-time user geolocation on the HMI and/or transmitting the real-time user geolocation and the real-time vehicle geolocation to the other vehicles when the vehicle may move away from the bus stop.

The present disclosure discloses a vehicle or a school bus that facilitates users/children to conveniently board the vehicle. The vehicle outputs real-time geolocation of users in proximity to the bus stop on the vehicle HMI, which enables the driver to wait and let those users conveniently board the vehicle who may be slightly delayed. Further, the vehicle transmits real-time geolocation of users and real-time vehicle geolocation to other vehicles in proximity to the bus stop, thereby enabling the drivers of other vehicles to let the users conveniently reach to the bus stop and the vehicle to move towards/away from the bus stop.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 (or a first vehicle), which may be, for example, a school bus, a transit bus, a shuttle, and/or the like. The vehicle 102 may be a manually driven vehicle and/or may be configured to operate in a partially or fully autonomous mode. The vehicle 102 may be configured to transport a plurality of users 104a, 104b, 104c (e.g., school children) from a bus stop 106 to the school and back. In the exemplary aspect depicted in FIG. 1, the vehicle 102 may be located at the bus stop 106, and the users 104a and 104b may be boarding the vehicle 102. Further, the user 104c may be running towards the bus stop 106 to board the vehicle 102. Collectively, the users 104a, 104b and 104c are referred to as users 104 in the present disclosure.

The vehicle 102 may be configured to implement a plurality of measures to ensure that the users 104 conveniently catch and board the vehicle 102. For example, the vehicle 102 may determine if a user (e.g., the user 104c) may be running late in reaching to the bus stop 106. In such instances, the vehicle 102 may stop at the bus stop 106 for slightly longer time duration than normal, to enable the user 104c to conveniently catch and board the vehicle 102. Further, the vehicle 102 may broadcast real-time geolocation of each user 104 to a plurality of other vehicles 108a, 108b (referred to as vehicles 108 or second vehicles) that may be located in proximity to the bus stop 106 or the vehicle 102. The vehicles 108 may receive the real-time user geolocations and display the user geolocations on respective Human-Machine Interfaces (HMIs). Drivers associated with the vehicles 108 may view the real-time user geolocations on the HMI and may accordingly maneuver (e.g., slow down) their vehicle movement to let the users 104 conveniently reach to the bus stop 106 and board the vehicle 102. Furthermore, the vehicle 102 may transmit notifications to user devices associated with the users 104 or users' parents, when the vehicle 102 may be running late in reaching to the bus stop 106, thus enabling the users 104 to plan their arrival time to the bus stop 106.

Figure 2:
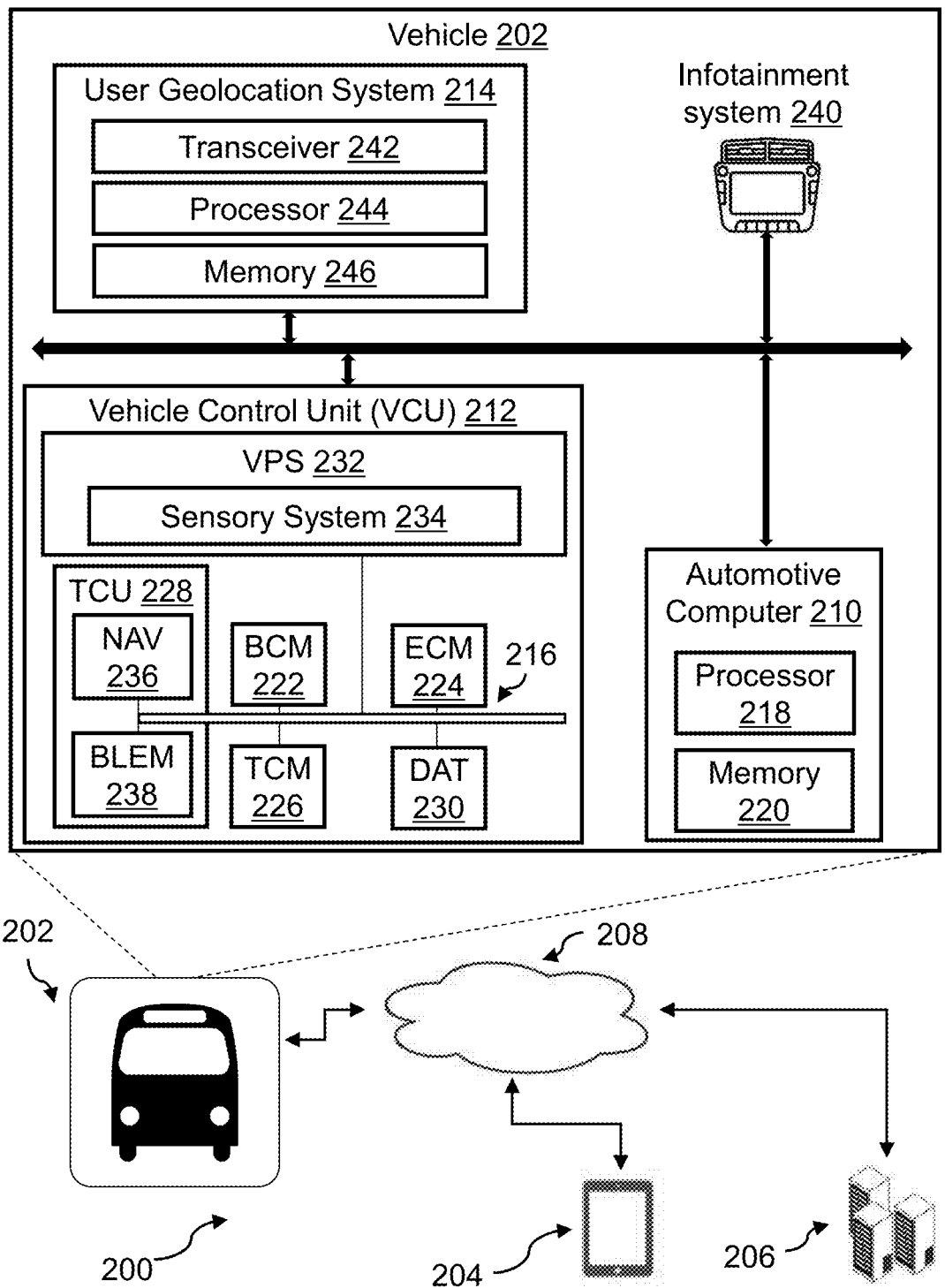
FIG. 2 depicts a block diagram of an example system for facilitating a plurality of users to board a vehicle in accordance with the present disclosure.

In some aspects, the vehicle 102 may be communicatively coupled with one or more server(s) (shown as server(s) 206 in FIG. 2) that may be configured to determine real-time geolocations of user devices (shown as user device 204 in FIG. 2) associated with the users 104. The server may transmit the real-time user device geolocation to the vehicle 102 when the vehicle 102 may be approaching the bus stop 106. Responsive to receiving the real-time user device geolocation, a Human-Machine Interface or an infotainment system (shown as infotainment system 240 in FIG. 2) associated with the vehicle 102 may display the real-time user device geolocation associated with each user 104 (and hence real-time geolocation of each user 104). In some aspects, in addition to or alternative to receiving the real-time user device geolocation, the vehicle 102 may determine the real-time geolocation of each user 104 based on inputs received from connected infrastructure sensors, vehicle sensors (e.g., vehicle cameras), image recognition, Artificial Intelligence/Machine Leaning (AI/ML) based correlation of user movement patterns, and/or the like. A vehicle operator (e.g., school bus driver) may view the real-time user device geolocation (or the real-time geolocation of each user 104) and determine if all the users 104 expected to be at the bus stop 106 are located at the bus stop 106, or if one or more users (e.g., the user 104c) may not be present at the bus stop 106 but may be approaching the bus stop 106 (e.g., running towards it). Responsive to such determination, the vehicle operator may wait for longer time duration than normal at the bus stop 106, to enable the user 104c to conveniently reach to the bus stop 106 and board the vehicle 102. In some aspects, if the vehicle 102 determines that the user 104c may be more than a predefined distance away from the bus stop 106 (based on the real-time user device geolocation associated with the user 104c) at vehicle's scheduled departure time from the bus stop 106, the vehicle 102 may transmit (either directly or via the server/connected infrastructure) a notification to the user device associated with the user 104c indicating that the vehicle 102 may be about to depart from the bus stop 106. In this case, the user 104c may decide to board the vehicle 102 at any other bus stop on the route to the school.

In some aspects, the vehicle 102 may obtain the real-time user device geolocation from the server when the vehicle 102 may be located a predefined distance (e.g., 200 or 300 meters) away from the bus stop 106 and/or at a predefined time duration (e.g., 2-3 minutes) before a scheduled vehicle arrival time at the bus stop 106. In some aspects, the predefined distance may also be a predefined virtual zone (with predefined dimensions, e.g., radius) around the bus stop 106. For example, if the scheduled vehicle arrival time at the bus stop 106 is 7:35 AM, the vehicle 102 may transmit a request at 7:33 AM to the server to obtain the real-time user device geolocation for each user 104 who may be expected to board the vehicle 102 at the bus stop 106.

In additional aspects, the vehicle 102 may directly transmit the obtained real-time user device geolocation to the plurality of vehicles 108 via vehicle-to-vehicle (V2V) communication, to facilitate the drivers associated with the vehicles 108 to view the real-time user geolocation, as described above. In other aspects, the vehicle 102 may "indirectly" transmit the obtained real-time user device geolocation to the plurality of vehicles 108 via the server or a connected infrastructure (e.g., a connected lamppost, via vehicle-to-infrastructure (V2I) or vehicle-to-everything (V2X) communication). Further, along with the real-time user device geolocation, the vehicle 102 may also transmit its own geolocation (i.e., real-time vehicle geolocation) to the plurality of vehicles 108. The drivers associated with the plurality of vehicles 108 may view the real-time vehicle geolocation and may accordingly move the vehicles 108 to enable the vehicle 102 to conveniently pick the users 104 from the bus stop 106 and travel towards the school.

Further details associated with the vehicle 102 and the process of facilitating the users 104 to conveniently catch and board the vehicle 102 are described below in conjunction with FIG. 2.

The vehicle 102 implements and/or performs operations, as described here in the present disclosure, in accordance with the owner manual and safety guidelines. In addition, any action taken by the vehicle operator and/or the drivers associated with the vehicles 108 based on recommendations or notifications provided by the vehicle 102 should comply with all the rules specific to the location and operation of respective vehicles (e.g., Federal, state, country, city, etc.). The recommendation or notifications, as provided by the vehicle 102, should be treated as suggestions and only followed according to any rules specific to the location and operation of respective vehicles.

FIG. 2 depicts a block diagram of an example system 200 for facilitating the users 104 to board a vehicle 202 in accordance with the present disclosure. The vehicle 202 may be same as the vehicle 102 described above. While describing FIG. 2, references will be made to FIGS. 3 and 4.

The system 200 may include the vehicle 202, one or more user devices 204 and one or more servers 206 communicatively coupled with each other via one or more networks 208. The user devices 204 may be associated with the users 104. Although FIG. 2 depicts a single user device 204, the vehicle 202 may be communicatively coupled with a plurality of user devices 204, and each user device 204 may be associated with each user 104. The user device 204 may be, for example, a mobile phone, a laptop, a computer, a tablet, a wearable device, or any other similar device with communication capabilities.

The server(s) 206 may be part of a cloud-based computing infrastructure and may be associated with and/or include a Telematics Service Delivery Network (SDN) that provides digital data services to the vehicle 202 and other vehicles (e.g., the vehicles 108 described above, not shown in FIG. 2). In further aspects, the server(s) 206 may be associated with a navigation services firm and may be configured to determine real-time geolocations of the user devices 204. In this case, the server(s) may be communicatively coupled with each user device 204 and may be configured to determine real-time geolocation of each user device 204. The server(s) 206 may transmit the real-time geolocation of each user device 204 to the vehicle 202 when the vehicle 202 transmits a request to the server(s) 206 to obtain respective real-time user device geolocations. In additional aspects, the server(s) 206 may be associated with a school bus fleet management firm and may be further configured to store information associated with a plurality of pick-up points associated with a plurality of vehicles (including the vehicle 202) that may be part of a vehicle/school bus fleet. In an exemplary aspect, the pick-up points may be bus stops (e.g., the bus stop 106) associated with the vehicle 202 or the bus stops that the vehicle 202 may be expected to traverse in its route to pick-up and drop the children/users 104. The information associated with each pick-up point may include, but is not limited to, names, addresses, contacts details, etc. of all children/users expected to board the vehicle 202 at the pick-up point, identifiers (e.g., IDs) of user devices associated with all children/users expected to board the vehicle 202 at the pick-up point, pick-up point location, scheduled arrival time of the vehicle 202 (or "scheduled vehicle arrival time") at the pick-up point, scheduled departure time of the vehicle 202 (or "scheduled vehicle departure time") from the pick-up point, and/or the like. For example, the information associated with the bus stop 106 may include bus stop location, names/addresses/contact details associated with the users 104, IDs of the user devices 204 associated with the users 104, scheduled vehicle arrival time at the bus stop 106 of 7:35 AM and schedule vehicle departure time from the bus stop 106 of 7:37 AM. The server(s) 206 may transmit the information associated with each pick-up point on a vehicle route to the vehicle 202 when or before the vehicle 202 commences travel from the school or depot to pick-up users from respective pick-up points/bus stops.

Although the description above describes an aspect where the vehicle 202 is a school bus and the users 104 are school children, the present disclosure is not limited to such as aspect. The present disclosure may be applied to public transportation as well. In this case, the vehicle 202 may be a public transport vehicle and the information associated with the pick-up point may include information from public transit apps, routes with the pick-up point as a destination, estimated time of arrival (ETA) of users with the pick-up point as a destination, work schedules of users en route, ETAs of other vehicles with potential transfer customers on board, availability of the next vehicle to stop at the pick-up point, etc. In further aspects, the vehicle 202 may be a mobile chair for elders (in this case, the users 104 may be the elders) pushed by another user or driven to senior homes, vehicles used in senior homes, kindergartens, day care, delivery/construction vehicle or pick/rideshare with multiple members on board dropped at different locations/sites, without departing from the scope of the present disclosure.

The network(s) 208 illustrates an example communication infrastructure in which the connected devices discussed in various embodiments of this disclosure may communicate. The network(s) 208 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an automotive computer 210, a Vehicle Control Unit (VCU) 212, and a user geolocation system 214 (or system 214). The VCU 212 may include a plurality of Electronic Control Units (ECUs) 216 disposed in communication with the automotive computer 210.

In some aspects, the user device 204 may be configured to connect with the automotive computer 210 and/or the system 214 via the network 208, which may communicate via one or more wireless connection(s) and/or may connect with the vehicle 202 directly by using near field communication (NFC) protocols, Bluetooth® protocols, Wi-Fi, Ultra-Wide Band (UWB), and other possible data connection and sharing techniques.

The automotive computer 210 and/or the system 214 may be installed anywhere in the vehicle 202, in accordance with the disclosure. Further, the automotive computer 210 may operate as a functional part of the system 214. The automotive computer 210 may be or include an electronic vehicle controller, having one or more processor(s) 218 and a memory 220. Moreover, the system 214 may be separate from the automotive computer 210 (as shown in FIG. 2) or may be integrated as part of the automotive computer 210.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure. The memory 220 may be a non-transitory computer-readable storage medium or memory storing a user geolocation program code. The memory 220 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 212 may share a power bus with the automotive computer 210 and may be configured and/or programmed to coordinate the data between vehicle systems, connected servers (e.g., the server (s) 206), and other vehicles (not shown in FIG. 2) operating as part of a vehicle fleet. The VCU 212 may include or communicate with any combination of the ECUs 216, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 212 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging ("lidar") sensor, door sensors, proximity sensors, temperature sensors, wheel sensors, one or more ambient weather or temperature sensors, vehicle interior and exterior cameras, steering wheel sensors, inertial measurement unit (IMU), etc.

In some aspects, the VCU 212 may control vehicle operational aspects and implement one or more instruction sets received from the server(s) 206, from one or more instruction sets stored in the memory 220, including instructions operational as part of the system 214.

The TCU 228 may be configured and/or programmed to provide vehicle connectivity to wireless computing systems onboard and off board the vehicle 202 and may include a Navigation (NAV) receiver 236 for receiving and processing a GPS signal, a BLE® Module (BLEM) 238, a Wi-Fi transceiver, a UWB transceiver, and/or other wireless transceivers (not shown in FIG. 2) that may be configurable for wireless communication (including cellular communication) between the vehicle 202 and other systems (e.g., a vehicle key fob, not shown in FIG. 2, the server(s) 206, the user device 204, etc.), computers, and modules. The TCU 228 may be disposed in communication with the ECUs 216 by way of a bus. In some aspects, the TCU 228 may be configured to determine a real-time vehicle geolocation, e.g., via the NAV receiver 236.

The ECUs 216 may control aspects of vehicle operation and communication using inputs from human drivers, inputs from the automotive computer 210, the system 214, and/or via wireless signal inputs received via the wireless connection(s) from other connected devices, such as the server(s) 206, among others.

The BCM 222 generally includes integration of sensors, vehicle performance indicators, and variable reactors associated with vehicle systems and may include processor-based power distribution circuitry that may control functions associated with the vehicle body such as lights, windows, security, camera(s), audio system(s), speakers, wipers, door locks and access control, various comfort controls, etc. The BCM 222 may also operate as a gateway for bus and network interfaces to interact with remote ECUs (not shown in FIG. 2).

The DAT controller 230 may provide Level-1 through Level-3 automated driving and driver assistance functionality that may include, for example, active parking assistance, vehicle backup assistance, adaptive cruise control, and/or lane keeping, among other features. The DAT controller 230 may also provide aspects of user and environmental inputs usable for user authentication.

In some aspects, the automotive computer 210 may connect with an infotainment system 240 (or a vehicle Human-Machine Interface (HMI)). The infotainment system 240 may include a touchscreen interface portion and may include voice recognition features, biometric identification capabilities that may identify users based on facial recognition, voice recognition, fingerprint identification, or other biological identification means. In other aspects, the infotainment system 240 may be further configured to receive user instructions via the touchscreen interface portion, and/or output or display notifications, navigation maps, real-time user geolocations, etc. on the touchscreen interface portion.

The computing system architecture of the automotive computer 210, the VCU 212, and/or the system 214 may omit certain computing modules. It should be readily understood that the computing environment depicted in FIG. 2 is an example of a possible implementation according to the present disclosure, and thus, it should not be considered as limiting or exclusive.

In accordance with some aspects, the system 214 may be integrated with and/or executed as part of the ECUs 216. The system 214, regardless of whether it is integrated with the automotive computer 210 or the ECUs 216, or whether it operates as an independent computing system in the vehicle 202, may include a transceiver 242, a processor 244, and a computer-readable memory 246.

The transceiver 242 may be configured to receive information/inputs from one or more external devices or systems, e.g., the user device 204, the server(s) 206, and/or the like, via the network 208. For example, the transceiver 242 may be configured to receive real-time geolocation of each user device 204 and the information associated with each pick-up point (e.g., the bus stop 106) from the server(s) 206. Further, the transceiver 242 may transmit notifications, requests, signals, etc. to the external devices or systems. In addition, the transceiver 242 may be configured to receive information/inputs from vehicle components such as the vehicle sensory system 234, one or more ECUs 216, and/or the like. Further, the transceiver 242 may transmit signals (e.g., command signals) or notifications to the vehicle components such as the BCM 222, the infotainment system 240, and/or the like.

The processor 244 and the memory 246 may be same as or similar to the processor 218 and the memory 220, respectively. In some aspects, the processor 244 may utilize the memory 246 to store programs in code and/or to store data for performing aspects in accordance with the disclosure. The memory 246 may be a non-transitory computer-readable storage medium or memory storing the user geolocation program code. In some aspects, the memory 246 may additionally store instructions/information/data obtained from the server(s) 206, the user device 204, and/or the like.

In operation, when the vehicle 202 may be travelling towards the bus stop 106, the processor 244 may obtain the information associated with the bus stop 106 from the transceiver 242 (that the transceiver 242 may receive from the server(s) 206, as described above) or from the memory 246. The processor 244 may further obtain a current time from a vehicle timer (not shown) and a real-time vehicle geolocation from the TCU 228. Responsive to obtaining the information described above, the processor 244 may determine whether a predefined condition may be met based on the current time, the real-time vehicle geolocation, and the information associated with the bus stop 106.

In some aspects, the processor 244 may determine that the predefined condition may be met when a difference between the scheduled vehicle arrival time at the bus stop 106 (as determined from the information associated with the bus stop 106) and the current time may be less than a predefined time duration (e.g., 2 or 3 minutes). For example, if the scheduled vehicle arrival time at the bus stop 106 is 7:35 AM and the current time is 7:33 AM, the processor 244 may determine that the predefined condition may be met.

In further aspects, the processor 244 may determine that the predefined condition may be met when the vehicle 202 may be located (as determined from the real-time vehicle geolocation) within a first predefined distance (e.g., 200 to 300 meters) of the pick-up point location or bus stop location (as determined from the information associated with the bus stop 106). For example, the processor 244 may determine that the predefined condition may be met when the real-time vehicle geolocation may be within a 300 meter radius of the bus stop 106. In some aspects, the processor 244 may determine that the predefined condition may be met when the real-time vehicle geolocation may be inside a predefined virtual zone (with predefined dimensions, e.g., radius) around the bus stop 106.

Responsive to determining that the predefined condition may be met, the processor 244 may transmit, via the transceiver 242, a request to the server(s) 206 to obtain real-time geolocations of the user devices 204 associated with the users 104. In some aspects, the processor 244 may transmit IDs associated with the user devices 204 (as determined from the information associated with the bus stop 106) to the server(s) 206 along with the request or as part of the request, to obtain real-time geolocations of the user devices 204 (or real-time user device geolocation) from the server(s) 206. Responsive to receiving the request from the processor 244 (via the transceiver 242), the server(s) 206 may transmit the real-time user device geolocation to the transceiver 242/processor 244. A person ordinarily skilled in the art may appreciate that if the users 104 are carrying the user device 204 with them when they approach the bus stop 106, the real-time user device geolocation may be equivalent to the real-time user geolocation.

Figure 3:
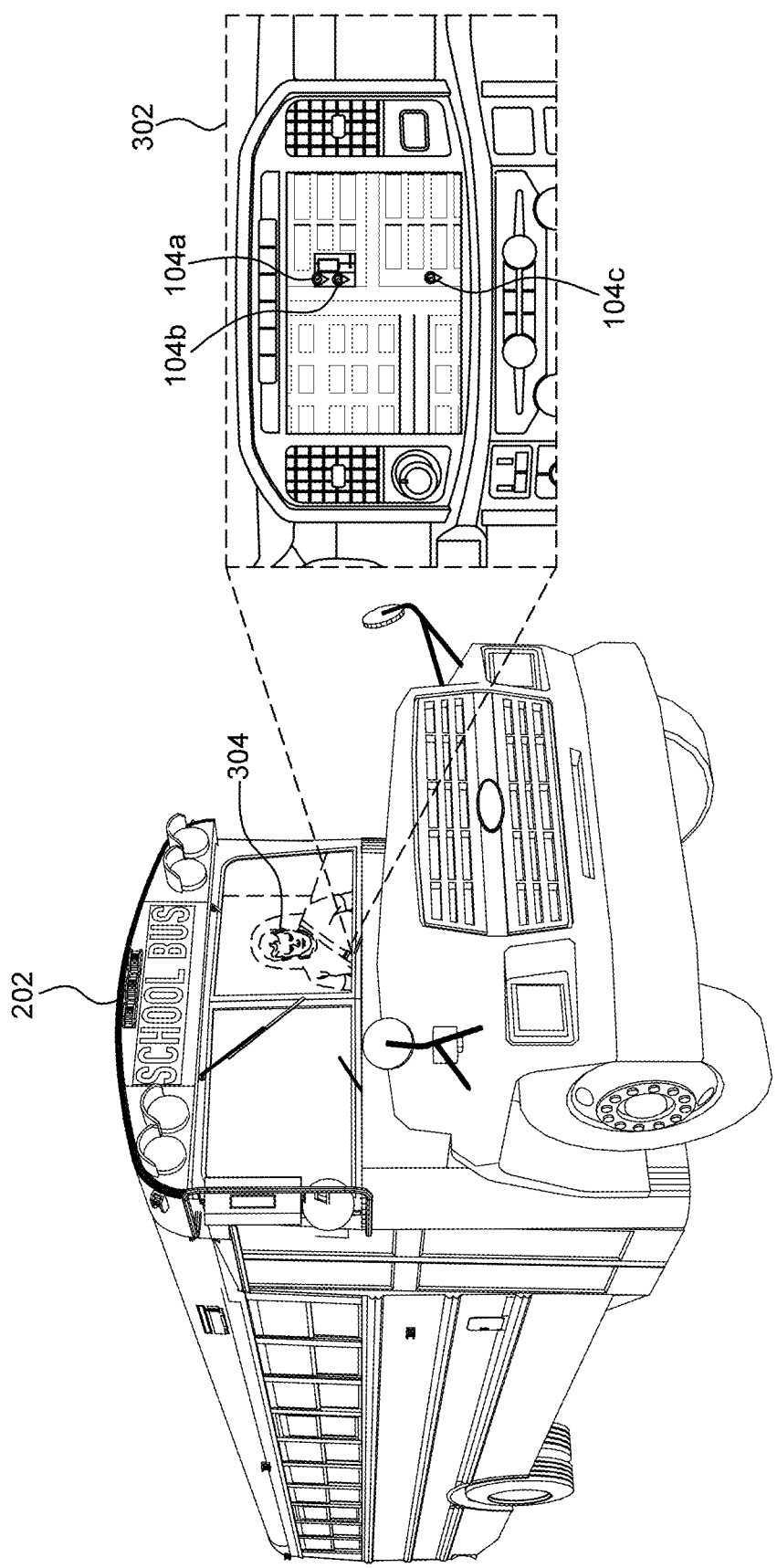
FIG. 3 depicts an example view of a vehicle Human-Machine Interface (HMI) in accordance with the present disclosure.

Responsive to obtaining the real-time user device geolocation (or real-time user geolocation), the processor 244 may transmit the real-time user geolocation to the infotainment system 240 to output the real-time user geolocation on an infotainment system screen. An example view 302 of an infotainment system screen depicting the real-time user geolocation of the users 104 is shown in FIG. 3.

When the infotainment system 240 outputs the real-time user geolocation, a vehicle operator 304 (e.g., a school bus driver) associated with the vehicle 202 may view the real-time user geolocation and see if one or more users (e.g., the user 104c) may be running towards the bus stop 106 (and may be late). Responsive to such determination and when the user 104c may be within a second predefined distance (e.g., 100-150 meters) of the bus stop 106, the vehicle 202 may wait at the bus stop 106 and let the user 104c conveniently reach to the bus stop 106 and board the vehicle 202. Specifically, in this case, when the vehicle 202 may be located at the bus stop 106, the processor 244 may compare the current time with the scheduled vehicle departure time (as determined from the information associated with the bus stop 106). Based on the comparison, the processor 244 may determine that the current time may be equivalent to the scheduled vehicle departure time. Responsive to determining that the current time may be equivalent to the scheduled vehicle departure time, the processor 244 may determine if the user device 204 associated with the user 104c is located less than the second predefined distance (e.g., 100-150 meters) from the bus stop 106, based on the bus stop location and the real-time geolocation of the user device 204. The processor 244 may output an alert notification (audibly and/or visually) on the infotainment system 240, when the processor 244 determines that the user device 204 (and hence the user 104c) may be located less than the second predefined distance from the bus stop 106. The vehicle operator 304 may hear or view the alert notification, and may not commence driving. In this case, the vehicle operator 304 may wait and let the user 104c reach to the bus stop 106 and board the vehicle 202. In this manner, the processor 244 facilitates the user 104c to conveniently board the vehicle 202, even if the user 104c may be slightly delayed.

On the other hand, when the processor 244 determines that the user device 204 (and hence the user 104c) may be located more than the second predefined distance away from the bus stop 106, the processor 244 may transmit, via the transceiver 242, a departure notification to the server(s) 206, which may then forward/transmit the departure notification to the user device 204 associated with the user 104c. The departure notification may indicate to the user 104c that the vehicle 202 may be departing from the bus stop 106, and the user 104c may plan to catch the vehicle 202 at any other bus stop along the route to the school.

In additional aspects, responsive to obtaining the real-time user device geolocation (or real-time user geolocation) associated with the users 104, the processor 244 may transmit, via the transceiver 242, the real-time user device geolocation to the vehicles 108 (and other vehicles) that may located within a third predefined distance (e.g., 500-600 meters) in proximity to the bus stop 106 (and/or parent's user devices associated with the users 104). In some aspects, the processor 244 may directly transmit the real-time user device geolocation to the vehicles 108 via vehicle-to-vehicle (V2V) communication. In other aspects, the processor 244 may indirectly transmit the real-time user device geolocation to the vehicles 108 via the server(s) 206 and/or a connected infrastructure (using vehicle-to-infrastructure (V2I) or vehicle-to-everything (V2X) communication). In further aspects, along with the real-time user device geolocation, the processor 244 may transmit the real-time geolocation of the vehicle 202 or the real-time vehicle geolocation (that the processor 244 may obtain from the TCU 228) to the vehicles 108.

Figure 4:
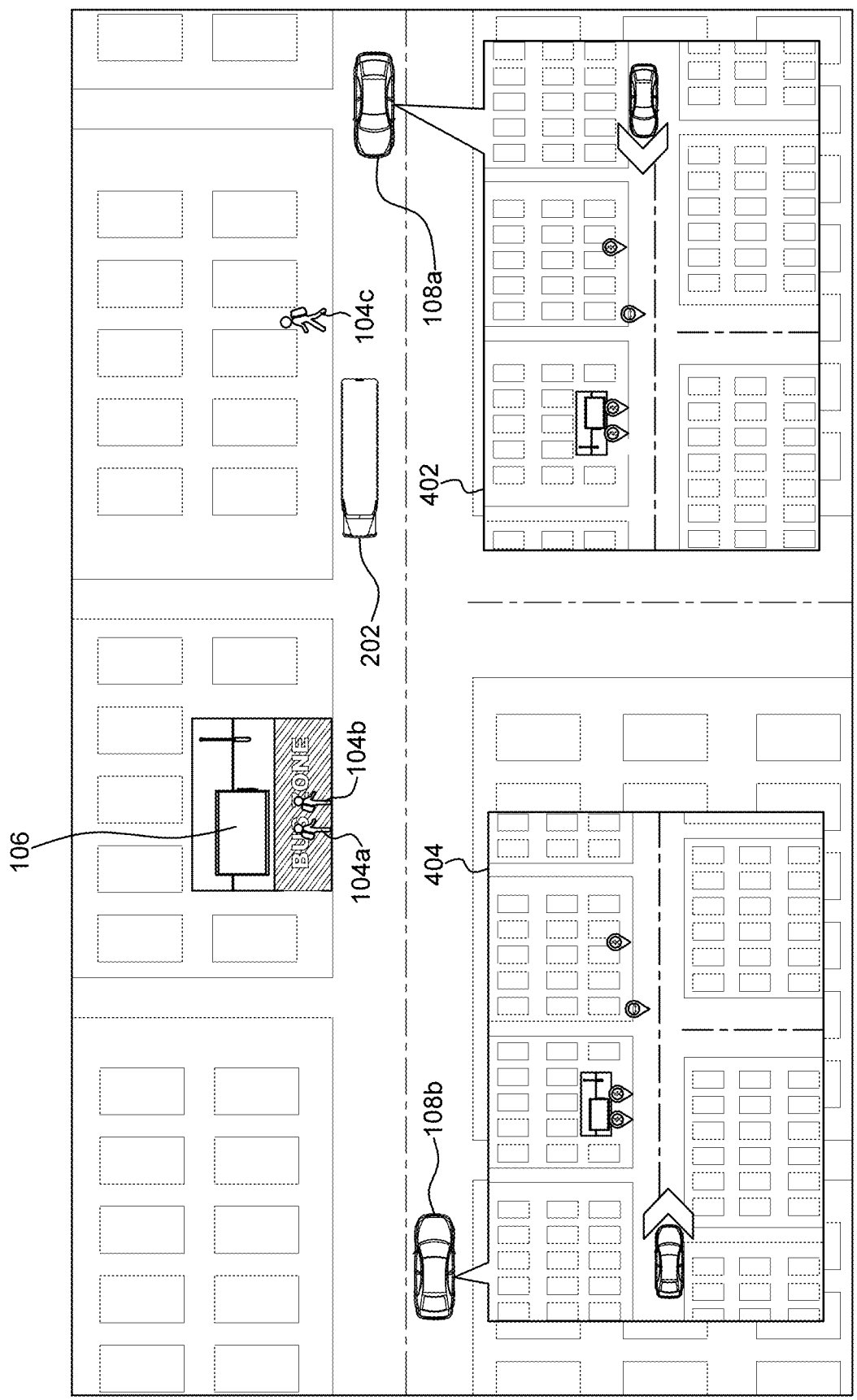
FIG. 4 depicts an example view of a plurality of vehicles and a plurality of users located in a geographical area in accordance with the present disclosure.

Responsive to receiving the real-time user device geolocation and the real-time vehicle geolocation from the processor 244, Human-Machine Interfaces (HMIs) associated with the vehicles 108 may display the received geolocation information relative to the respective vehicles 108, as shown in views 402 and 404 of FIG. 4. Drivers associated with the vehicles 108 may view the geolocation information and may accordingly maneuver (e.g., slow down) respective vehicle movement, thereby enabling the users 104 to conveniently reach to the bus stop 106, and/or the vehicle 202 to conveniently reach to the bus stop 106 and then depart from the bus stop 106.

When the vehicle 202 departs from the bus stop 106, the processor 244 may continue to obtain and monitor the real-time vehicle geolocation (as obtained from the TCU 228). Based on the real-time vehicle geolocation monitoring, the processor 244 may determine when the vehicle 202 moves the first predefined distance (e.g., 200 to 300 meters) away from the bus stop 106. Responsive to determining that the vehicle 202 may have moved the first predefined distance away from the bus stop 106, the processor 244 may stop transmitting/outputting the real-time user geolocation to/from the infotainment system 240. Further, at this point, the processor 244 may stop transmitting the real-time user device geolocation and the real-time vehicle geolocation to the vehicles 108.

The processor 244 may repeat the process described above when the vehicle 202 moves towards the next bus stop. In this manner, the processor 244 may facilitate all the users/children expected to board the vehicle 202 to conveniently reach to respective bus stops and catch the vehicle 202.

In additional aspects of the present disclosure, the processor 244 may use AI/ML (and/or data obtained from the server 206 or cloud) to dynamically train and update the map, boundary and/or dimensions of the predefined virtual zone (or the predefined distance) around the vehicle 202 and/or the bus stop 106, based on one or more parameters including, but not limited to, presence of obstructions or structures (e.g., constructions, blocks, detour, etc.) in proximity to the vehicle 202 and/or the bus stop 106, time of day, bus stop location, etc. For example, the virtual zone dimensions may be different during school hours or school times on weekdays as compared to weekends.

Further, even though the present disclosure is described by using an example aspect where the vehicle 202 is a school bus and the users 104 are school children, the present disclosure is not limited to such an aspect. In alternative aspects, the vehicle 202 may be a mobile chair for elders (in this case, the users 104 may be the elders) pushed by another user or driven to senior homes, vehicles used in senior homes, kindergartens, day care, delivery/construction vehicle or pick/rideshare with multiple members on board dropped at different locations/sites, without departing from the scope of the present disclosure.

Figure 5:
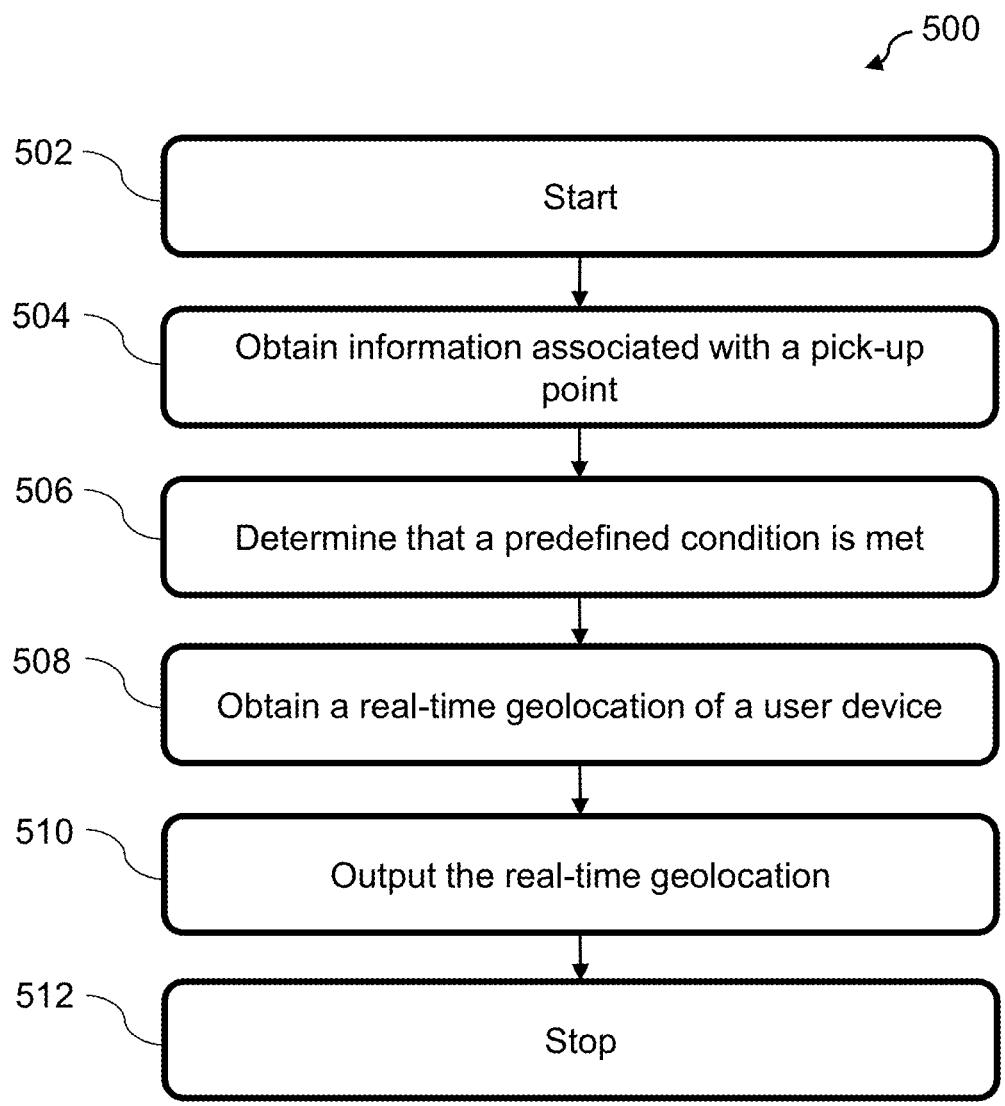
FIG. 5 depicts a flow diagram of an example method for facilitating a user to board a vehicle in accordance with the present disclosure.

FIG. 5 depicts a flow diagram of an example method 500 for facilitating the user 104 to board the vehicle 202 in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include obtaining, by the processor 244, information associated with the pick-up point (e.g., the bus stop 106) associated with the user 104. At step 506, the method 500 may include determining, by the processor 244, that the predefined condition may be met based on the information associated with the pick-up point. As described above, the predefined condition may be met when the vehicle 202 may be located within the first predefined distance from the bus stop 106 and/or when the current time may be a predefined time duration less than the scheduled vehicle arrival time at the bus stop 106.

At step 508, the method 500 may include obtaining, by the processor 244, the real-time geolocation of the user device 204 associated with the user 104, responsive to determining that the predefined condition may be met. At step 510, the method 500 may include outputting, by the processor 244, the real-time geolocation on the infotainment system 240.

The method 500 may end at step 512.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A first vehicle comprising:
a transceiver configured to receive information associated with a single pick-up point for both of a first user and a second user and a first real-time geolocation of a first device associated with the first user and a second real-time geolocation of a second device associated with the second user;
a human-machine interface (HMI) of the first vehicle configured to display the first real-time geolocation and the second real-time geolocation; and
a processor communicatively coupled with the transceiver and the HMI of the first vehicle, wherein the processor is configured to:
obtain the information associated with the pick-up point from the transceiver;
determine that a predefined condition is met based on the information associated with the pick-up point;
obtain the first real-time geolocation responsive to determining that the predefined condition is met;
output the first real-time geolocation and the second real-time geolocation on the HMI of the first vehicle;
determine, based on the second real-time geolocation, that the second device is located outside of a first predefined distance of the pick-up point;
autonomously drive, by the first vehicle, away from the pick-up point based on determining that the second device is located outside of the first predefined distance of the pick-up point;
stop output of the second real-time geolocation on the HMI of the first vehicle responsive to determining that the first vehicle has driven a second predefined distance away from the pick-up point; and
transmit the first real-time geolocation to a second vehicle in proximity to the pick-up point, responsive to obtaining the first real-time geolocation,
wherein the second vehicle presents the first real-time geolocation on an HMI of the second vehicle to allow the second vehicle to be maneuvered to allow the second user to reach the first vehicle.

2. The first vehicle of claim 1, wherein the information associated with the pick-up point comprises at least one of a pick-up point location, a scheduled vehicle arrival time at the pick-up point, and a scheduled vehicle departure time from the pick-up point.

3. The first vehicle of claim 2, wherein the predefined condition is met when the first vehicle is located within a third predefined distance of the pick-up point location.

4. The first vehicle of claim 2, wherein the predefined condition is met when a difference between the scheduled vehicle arrival time and a current time is less than a predefined time threshold.

5. The first vehicle of claim 4, wherein the processor is further configured to:
determine that the current time is equivalent to the scheduled vehicle departure time;
determine that the first device associated with the first user is located less than the first predefined distance away from the pick-up point based on the pick-up point location and the first real-time geolocation; and
output a notification to the HMI of the first vehicle responsive to determining that the first device associated with the first user is located less than the first predefined distance away from the pick-up point.

6. The first vehicle of claim 1, wherein the processor transmits the first real-time geolocation to the second vehicle via vehicle-to-vehicle (V2V) communication.

7. The first vehicle of claim 1 further comprising a telematics control unit configured to determine a real-time vehicle geolocation.

8. The first vehicle of claim 7, wherein the processor is further configured to:
obtain the real-time vehicle geolocation from the telematics control unit; and
transmit the real-time vehicle geolocation to the second vehicle.

* * * * *